United States Patent [19]
Kuehn et al.

[11] 3,822,504
[45] July 9, 1974

[54] AQUACULTURE STRUCTURE AND METHOD

[76] Inventors: Arthur C. Kuehn, 1561 W. George Washington Blvd., Davenport, Iowa 52804; Richard M. Kuebler, 1427 23rd St., Bettendorf, Iowa 52722

[22] Filed: Mar. 1, 1972

[21] Appl. No.: 230,578

[52] U.S. Cl. .......................... 47/1.2, 52/83
[51] Int. Cl. ............................... A01g 31/00
[58] Field of Search .................. 47/1.2, 17; 14/18

[56] References Cited
UNITED STATES PATENTS

| | | | |
|---|---|---|---|
| 293,577 | 2/1884 | Howe | 47/17 UX |
| 1,824,563 | 9/1931 | O'Connor | 47/17 |
| 2,855,725 | 10/1958 | Carothers | 47/17 |
| 3,063,195 | 11/1962 | Ravich | 47/17 |
| 3,481,073 | 12/1969 | Yoshida et al. | 47/17 |
| 3,660,933 | 5/1970 | Wong | 47/1.2 |

FOREIGN PATENTS OR APPLICATIONS

| | | | |
|---|---|---|---|
| 147,862 | 4/1959 | U.S.S.R. | 47/1.2 |
| 279,868 | 10/1927 | Germany | 47/17 |

*Primary Examiner*—Robert E. Pulfrey
*Assistant Examiner*—R. T. Rader
*Attorney, Agent, or Firm*—Jacques M. Dulin

[57] ABSTRACT

Aquaculture housing pod and method of culture employing heated water from a power plant in which the water temperature is cooled to near ambient for safe discharge into the ambient ecology. The aquaculture housing pods are designed to cover large areas, on the order of 150 acres each, and comprise a column and cable structure supporting overhead sprinkler systems for discharge on hydroponic beds contained under the housing pod structure. A series of aqueducts and hydroponic planting beds are arranged underneath the structure. The method involves discharging hot water from a power plant into a first holding and distribution reservoir, withdrawing water from the reservoir and passing it through either or both the aqueducts and sprinkler system of the housing pods, collecting excess water from the housing pod, and returning it to a neutral temperature reservoir before either recycling the cooled water to the power plant or discharging it to the environment. The aquaculture housing pod is simple of construction and inexpensive, and the method provides for cooling the water and discharge to the environment without harming the ecology.

10 Claims, 5 Drawing Figures

AQUACULTURE STRUCTURE AND METHOD

FIELD OF THE INVENTION

This invention relates to aquaculture in general, and more specifically, to housing pods therefor, and a method of aquaculture employing heated water from power plants in a manner which permits cooling of the water for return and reuse to the plant or for discharge back to the environment without harming the ecological balance thereof due to thermal pollution.

BACKGROUND

Present power plants employ large amounts of water for cooling of the various elements therein, the coal crushing apparatus, furnace walls, and generator assemblies and the like. Normally, the ambient water temperature from a river or lake is on the order to 50°-75°F, and the water may be discharged thereto with a temperature rise of from 25°-40°, that is, at a temperature of from 75°-90°F. In addition, vast quantities of water are used, on the order of ½ to 1,000,000 gallons of water per minute for power plants ranging from 1,500 to 2,500 megawatts.

For example, a typical power plant of capacity on the order of 2,100 megawatts will normally employ approximately 860,000 gallons of water per minute with a 20°-25° temperature rise from 50°F initial ambient temperature to a discharge temperature of 70°-75°F. This represents substantial thermal pollution for an ecology where the plant and animal life of the water source, such as a stream or lake, is in ecological balance at approximately 50°-60°F.

One solution to the problem has been to provide large artificial reservoirs into which the heated water can be discharged for cooling before returning the water to the natural source. For example, in the above 2,100 megawatt power plant, an artifical lake on the order of 1,200 acres has been provided.

However, this is not the solution in all cases since such vast areas of land are not always available for the artificial cooling lake purpose. This is particularly the case where power plants must be located near large population centers. This necessitates that power plants will have to be built far from centers of population where land is available, which in turn is inefficient since there is substantial energy lost in transmission to the point of use of the energy.

Other solutions have been proposed, such as discharge directly back into the rivers or lakes from which the water has been drawn. However, because of the increasing awareness of the ecological problems of thermal pollution, combined with the tightening of state and federal codes in connection with hot water discharge, this solution is no longer available. Common and well known examples of the inability to use natural sources is exemplified by the Quad Cities nuclear power plant near Cordova, Ill. which was to draw its water from the Mississippi River, the nuclear power plants border Lake Michigan, the Hudson River nuclear power plant, and the nuclear power plant near Miami, Florida. In all these cases, the discharge of water back into the ambient source was to be at a value much higher than could ecologically be permitted. Current codes are calling for discharge of water not more than about 2° above the ambient initial water temperature.

Thus, the power plants have had to engage in greatly increased capital expenditure in order to provide for large cooling reservoirs as above described, or cooling towers. In all of these solutions, the heat energy of the water is wasted. To our knowledge, there is no current proposal for putting that heat energy to work.

Current methods of aquaculture range from simple cheesecloth covered structures utilizing ground sprinklers or irrigation systems, such as are used in the growing of tobacco, to more sophisticated hydroponic beds employing gravel or wire mesh beds in water tanks inside permanent structures.

The first mentioned structure is merely a temporary structure for summer use only and is designed to reduce the "burning" of the tobacco plant by the action of the summer sun. These structures are not permanent from the point of view of wintertime utility. Quonset type structures employing plastic coverings are also generally used only in the summer, or to extend the growing season for a few months. Only in moderate climates are such structures used for substantially the entire year.

More permanent structures can be used in northern climates, but these structures are extremely expensive and generally are very, very small in area. Large structures, on the order contemplated by our invention, would be prohibitively expensive to the point where the food grown would be virtually financially unsalable.

THE INVENTION

Objects

It is an object of our invention to provide a large area aquaculture housing pod, and method for its year-round use in conjunction with the cooling water from power plants.

It is another object of our invention to provide a method of cooling water from power plants to employ the heat therefrom for substantially year-around growth of food, and to render the water safe for discharge to the ambient environment without a danger of thermal pollution.

It is another object of our invention to provide for a simple and relatively inexpensive structure for covering aquaculture beds of relatively large areas, from sizes of several acres up to hundreds of acres.

It is another object of our invention to provide a column and cable structure useful for housing an aquaculture system such as a hydroponic plant.

It is another object of our invention to provide special aqueducts and piping systems for use in connection with agriculture systems.

It is another object of our invention to provide a method of operation of aquaculture systems for year around operation in relatively cold climates.

Still other objects of our invention will be evident from the description which follows. The detailed description of our invention will make reference to the drawings in which.

The figures and specific examples described hereinafter are by way of illustration and not by way of limitation. Like parts in different figures are given like numbers.

SUMMARY OF THE INVENTION

The invention includes aquaculture housing pods capable of covering large areas, in conjunction with the hot water discharge from any source, such as power plant discharge. A typical aquaculture pod employs a cable roof structure supported between columns set approximately 300 feet apart. The roof may include a movable plastic roof covering material which may be open for summer operation. In addition, the cable roof structure includes a sprinkler system for summer operation. The 300 foot wide modules may be made in any length, and the columns may be placed any distance apart as dictated by engineering considerations. For the 300 foot width, the cable structures are typically spaced 50 feet apart. The aquaculture pod covers an aqueduct system which is used primarily for winter operation. The growing area may be a hydroponic-type planting bed of gravel lying over a plastic liner, and in which a series of aqueducts are spaced for the supplying of water to the bed as required.

In operation, the heated water from the power plant is passed into a first hold reservoir. This water is on the order of from 75°-100°F. This water is then passed into the sprinkler and/or aqueduct systems of the housing pods to supply heat and water to the growing plants. The water is cooled thereby and withdrawn from the housing pod and passed to a second reservoir before being released back to the natural ambient water source or for reuse in the power plant. The second, neutral temperature reservoir may optionally be used for a fish cribbing area. In normal summertime operation, the roof of the housing pod is open and the sprinkler system provides the source of heated water to the hydroponic beds below. In wintertime operation, the roof may be closed and the aqueduct system used for the water and heat supply.

DETAILED DESCRIPTION

Figure 1:
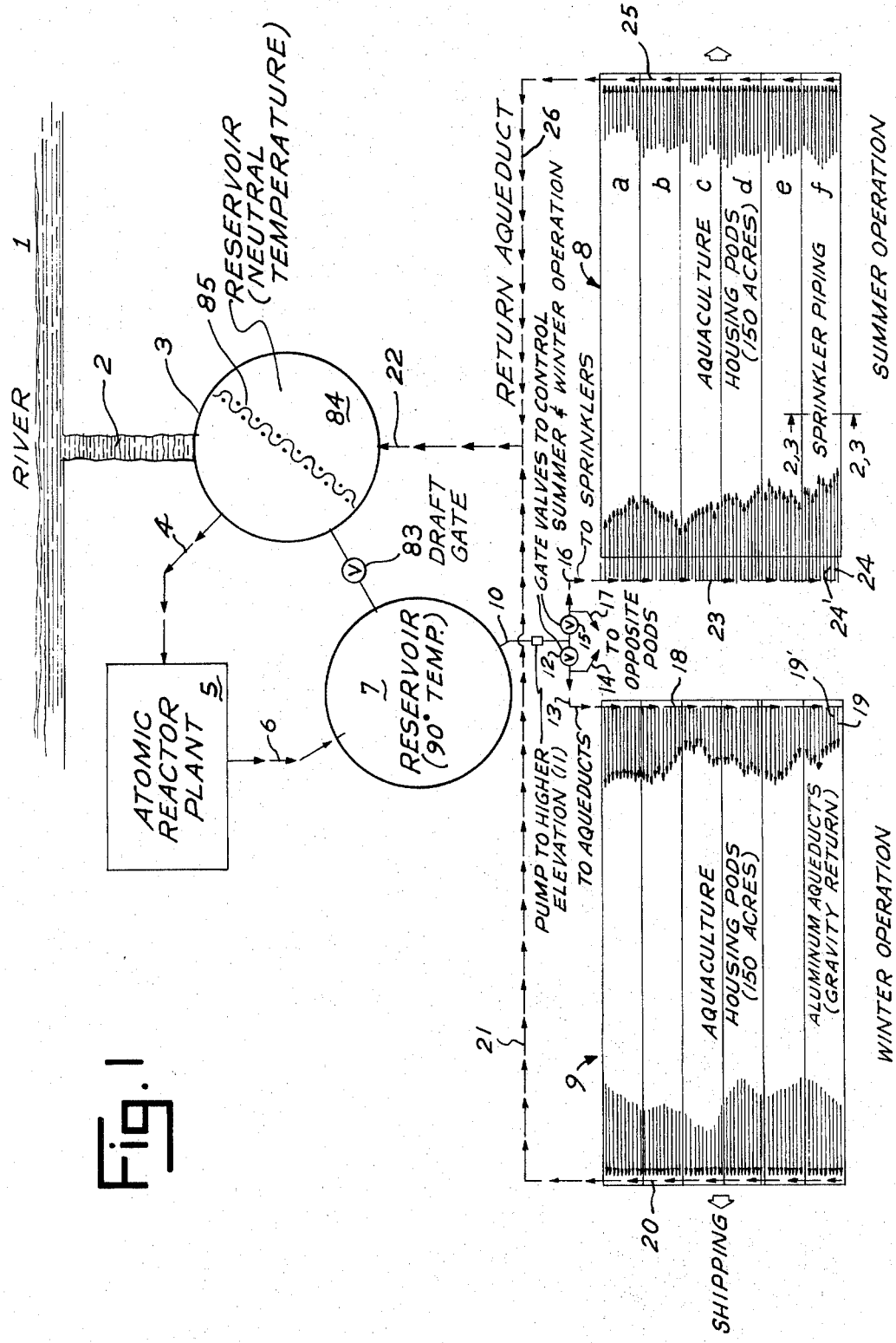
FIG. 1 is a schematic diagram of a hydroponic plant utilizing the aquaculture housing pods of this invention, and using the method of operation in conjunction with an atomic power plant hot water output.

FIG. 1 shows the schematic layout of the aquaculture system of this invention in combination with a typical hot water source. For purposes of example, this invention is applied to the Quad Cities power plant near Cordova, Illinois. The ambient water source for the power plant 1 is the Mississippi River. Water from the river flows through channel 2 into a neutral temperature reservoir 3. From the reservoir 3, the water is pumped through line 4 to the power plant 5. There, in processing, the water is raised from the ambient temperature on the order of from 50°-65°F up to about 90°F. The heated water is discharged via line 6 into the hot water reservoir 7 which has a typical year-round temperature of about 90°F.

FIG. 1 shows two aquaculture housing pods 8 and 9, in summer and winter operation, respectively. Water from the reservoir 7 is withdrawn through line 10 and pumped via pump 11 through either the aqueducts or the sprinklers. Gate valve 12 is opened for passage of the water through the aqueducts during winter operation. Line 13 connects to the housing pod 9 and line 14 connects to the aqueducts of housing pod 8.

For summer operation, gate valve 15 is opened and gate valve 12 may be closed. Upon opening of the gate valve 15, water passes through lines 16 and 17 to the housing pods 8 and 9, respectively.

Referring to the housing pod 9, the water from line 13 passes through distributor duct 18, and from there into the aqueducts 19, 19', etc., shown as horizontal lines with arrows from right to left.

These aqueducts operate by gravity return and are collected at collection duct 20 at the opposite end of the housing pod. The collection duct 20 empties into a return duct 21 which passes into the reservoir 3 via line 22. The water has been cooled upon passing through the housing pod sprinkler piping, aqueducts, and hydroponic beds, and is at relatively neutral temperature upon entering into reservoir 3. The water from line 22 is pooled with water incoming through the channel 2 and is free to either be recirculated into line 4 or to pass back out through channel 2 to the river 1.

Figure 3:
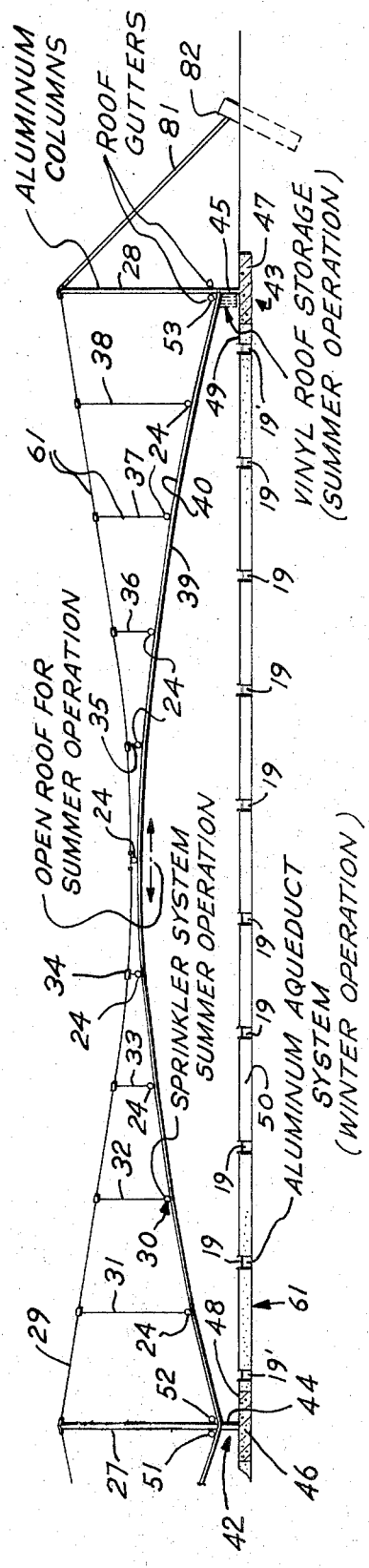
FIG. 3 shows a vertical section view of the agricultural housing pod shown in FIG. 2, and also shows the side anchoring system.

In summer operation, the gate valve 15 is open and water passes through lines 16 and 17 to sprinkler headers 23. These headers are ducted into the sprinkler system pipes 24, 24', etc., shown as arrows from left to right in housing pod 8. These pipes are elevated as can be seen in FIG. 3 and have attached thereto conventional sprinkler nozzles as required for watering of the plants and/or hydroponic beds therebelow. The water after having been sprinkled passes through the beds and into a collection duct 25 which passes via return aqueduct 26 to line 22 and vents into the neutral temperature reservoir 3.

In the alternative, if the water in the sprinkler pipe 24, 24' is sufficiently cooled in the pipes at the far right-hand end of the housing pods, the pipes may discharge therefrom into the collection duct 25 or be piped by a line (not shown) to the return aqueduct 26. Ordinarily, however, the sprinkler piping will be deadended to maintain sufficient pressure in the line for adequate sprinkling distribution over the plants and hydroponic beds below.

It should be understood that the two aquaculture housing pods 8 and 9 in FIG. 1 are shown in different phases of operation for purposes of illustration, but in practice would be operating similarly at any given time of the year. Likewise, it should be understood that the housing pod may consist of more or less than the modules 8a . . . 8f, depending upon the water output from the power plant and the amount of water required for the culture of the plants.

Figure 2:
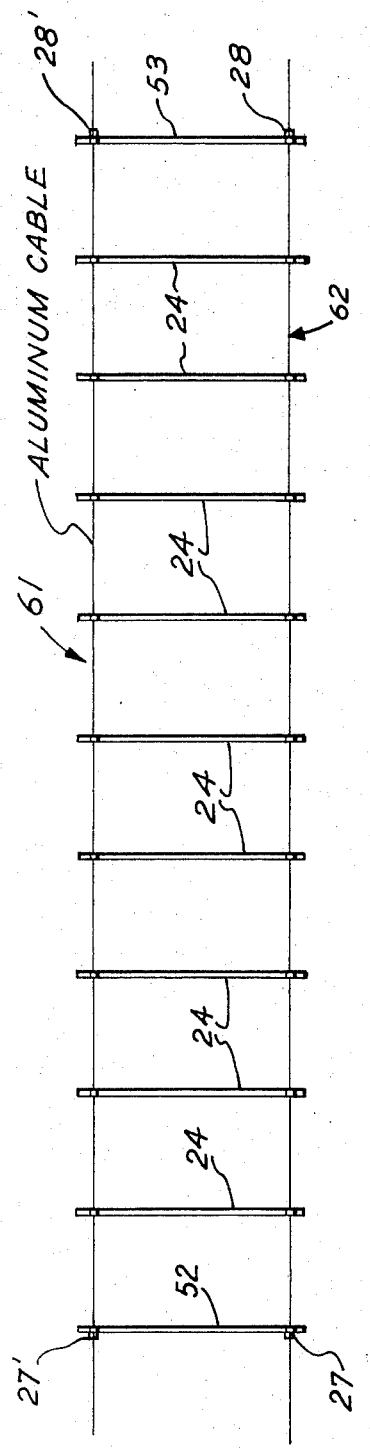
FIG. 2 is a plan section view of a portion of the agriculture housing pod in accordance with this invention showing a pair of roof support members spaced horizontally from each other in a longitudinal direction with the sprinkler pipes being hung therefrom in a direction transverse thereto.

FIG. 2 is a plan view of a portion of the aquaculture housing pod taken in the area of line 2–2 in FIG. 1. A plurality of roof support members 61, 62 are spaced horizontally from each other in a first longitudinal direction (from left to right along the housing pod 8 shown in FIG. 1). The roof support members comprise a cable structure described in more detail in connection with FIG. 3. Suspended from the cable structure can be seen a series of water distribution system pipes 24. Typically, these pipes may be eight inch diameter continuous aluminum sprinkler piping. Roof gutters 52 at each side of the section module shown in FIGS. 2 and 3 collect rain water run off from the roof when the roof is in the closed position. The support columns 27, 27' and 28, 28' may be typically made from aluminum.

FIG. 3 is a section taken along line 3—3 of FIG. 1 and shows a section of the aquaculture pod. The steel columns 27, 28 support a tensioned upper cable 29. The vertical cables 31 through 38 support the pipe-roof track assembly 30 which contains the sprinkler system piping 24. Together the cables 29, and 31 through 38 form a cable structure which supports a movable plastic roof 39 which is carried on roof tracks 40. As shown on the left of FIG. 3, the plastic roof is stored in its open position by sliding downward on the roof track 40, as at 86. The plastic roof material is gathered in folds for economy of space. The steel columns 27 and 28 are supported on foundation structures 42 and 43 which may include vertical side wall 44, 45 and horizontal footings 46 and 47. The horizontal footings may be made wide enough to provide for hard surface walkways 48 and 49 as needed. Likewise, other walkways may be spaced between the aqueducts 19, either parallel between them or transverse to them as needed for operation of the housing pod.

Ordinarily the roof may be in the open position for summer operation, in which case the plants in the hydroponic beds 50 are watered by the sprinkler system 24. However, for certain types of plant growth, it would be advisable, even during the summer, to promote a greenhouse effect by having the roof in the closed position. In this event, summer operation can be accommodated by the aqueducts 19. When the roof is in the closed position, provision for gathering rain water is provided by gutters 51 through 54 which are adjacent to the steel columns 27 and 28 respectively. The offflow from the gutters may be ducted to the aqueducts, the sprinkler system or reservoirs as desired.

FIG. 3 illustrates the end support system of the cable structure. The upper cable 29 and column 28 is guyed by cable 81 which is anchored in the ground by anchor 82. The cable system, support columns and anchoring system may be relatively conventional catenary type cable construction. The cable and support column structures shown in FIG. 3 are spaced apart from each other along the longitudinal axis of the housing pod as shown in FIG. 1 from 20 to 100 feet apart as dictated by load considerations. The roof structure may be of any flexible transparent or translucent material, such as heavy vinyl, on the order of from 3 to 15 mils. The roof material is movably secured to a track and roller system and is advanced from its closed to open position by a simple draw cable arrangement. Where load conditions require, the vinyl may be reinforced by flexible plastic fabric or metallic webbing or small diameter cables.

Figure 4:
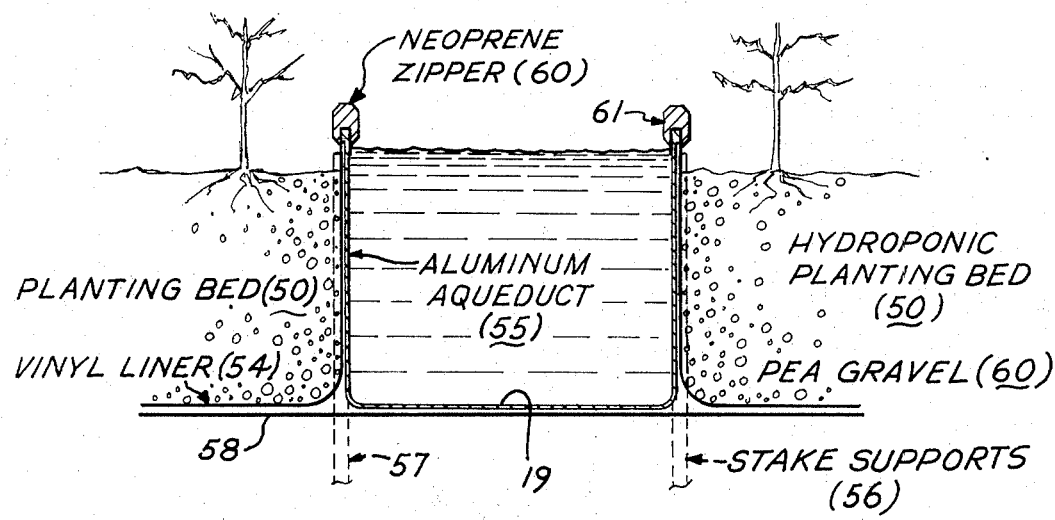
FIG. 4 is a detail section view through a hydroponic planting bed and the aqueduct system which is housed within the aquaculture housing pod.

FIG. 4 is a detail section of a single aqueduct, and shows the hydroponic planting bed assembly. A U-shaped aluminum aqueduct 55 is supported in position by stake supports 56, 57 at intervals along the sides thereof. The aqueduct 55 is generally placed on a flattened ground surface 58 which has been graded in an appropriate slope to provide for water flow along the aqueduct from the distribution duct 18 to the collection duct 20 (as seen in FIG. 1). Between the aqueducts is placed a plastic liner 59, for example of heavy vinyl, which is secured at its sides along the top edge of the aqueduct 55 by neoprene type zippers 60 and 61. The plastic is thus draped in a U-shape between the aqueducts, and is filled with pea gravel 60 to form the hydroponic planting bed 50. Appropriate inlets from the aqueduct to the hydroponic planting bed may be provided as desired along the length of the aqueduct 55. In the alternative siphons or pumps may be provided to distribute the water from the aqueduct 55 to the planting bed. These elements are not shown since they are conventional.

Referring back to FIG. 3 for the moment, in ordinary practice, the first duct 19' would be placed at position 61 where a walkway 48 was adjacent to the steel column supports. Water would then be distributed both to the left and to the right from that duct, rather than from the right only as presently illustrated in FIG. 2. Thus, one less duct would be used in the 300-foot span shown.

Figure 5:
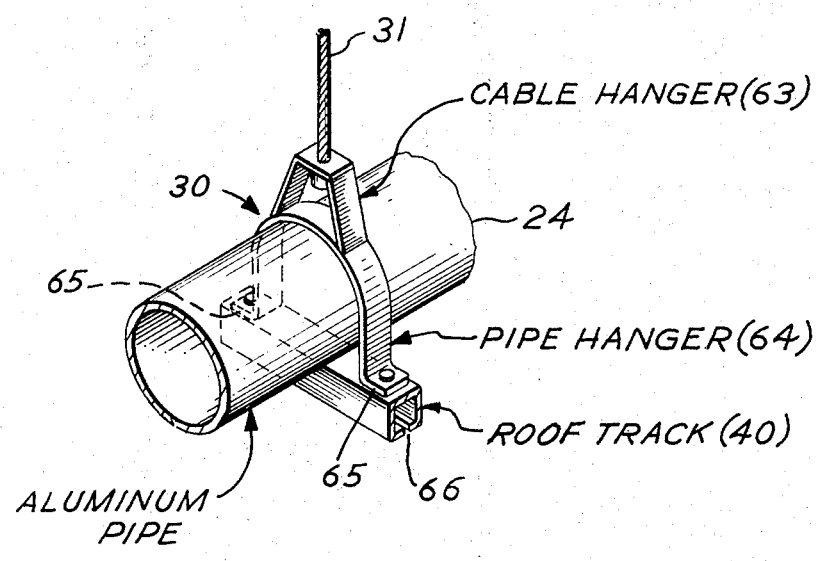
FIG. 5 is a detail perspective view showing the intersection of the vertical cable dependent from the cable structure as supporting the sprinkler pipe and roof track assembly.

FIG. 5 shows, in a detailed perspective, the means 30 for suspending the roof track assembly and sprinkler pipe water distribution means. Secured at the end of a vertical dependent cable 31 is a cable hanger member 63, which generally is an inverted U-shaped member with slightly spread arms. The cable hanger 63 is in turn secured to a pipe hanger member 64 which may be a large U bolt or rounded U-shaped strap as shown. The aluminum sprinkler system pipe 24 is placed within the pipe hanger strap assembly as shown in dotted lines. Secured to the dependent ends 65 of the pipe hanger 64 is a roof track member 40. In the embodiment shown, the roof track is a slotted hollow extrusion of square or rectangular cross-section. Slot 66 is provided in the bottom of the roof track member 40 to receive slides or rollers which in turn are attached to the roof member 39 and permit the roof to be moved from its open to its closed position and vice versa.

Various modifications can be made within the scope of this invention without departing from the spirit thereof, and we wish our invention to be limited by the following claims, as broadly as the prior art will permit, in view of our specification, if required. For example, a draft gate 83 may be provided between the neutral temperature reservoir 3 and the heated water reservoir 7 to provide for appropriate thermal dilution of either reservoir. Likewise, to provide for cable lengthening or shortening due to weather conditions, cable length compensating means may be provided either adjacent to the anchors 82 or at the top of the columns 27, 28. In another instance, a portion 84 of reservoir 3 may be provided by means of fence 85 for the purpose of fish cribbing. In the alternative, a third reservoir, not shown, may be provided intermediate line 22 and the reservoir 3 for the cribbing. While the roof is shown in two sections, it should be understood that it may be made in any number of sections, as convenient, and gathered at a plurality of places overhead along the roof track. Likewise, additional ground level sprinkling means may be employed, or the sprinkler piping system may be suspended below the roof for sprinkling, when the roof is closed. The vinyl bed liner 54 may be continuous and extend under the aqueducts 55 as desired. While the aqueducts are shown as of aluminum for heat conductivity to the beds, it should be understood that they may be made of concrete, tile, steel and the like.

We claim:

1. A large scale aquaculture housing pod module extending in a longitudinal direction comprising:
   a. a first pair of vertical support columns spaced from each other in a direction transverse to the longitudinal direction,
   b. a second pair of vertical support columns spaced form each other in a direction transverse to the longitudinal direction,
   c. said second pair of vertical support columns are aligned with and spaced apart from said first pair in said longitudinal direction,
   d. said columns having a base and a top,
   e. an upper cable supported from each of said column pairs proximate to said top, said cable being under tension and following a generally concave-up arcuate curve,
   f. a plurality of vertical cables attached to each of said upper cables,
   g. said vertical cables being laterally spaced from said columns and from each other along said upper cable,
   h. the length of said vertical cables being shortest at a point substantially midway between the first and second pairs of support columns,
   i. a first water distribution system suspended from said vertical cables for distribution of water primarily in the summer,
   j. a roof member suspended from said vertical cables a distance spaced above said column bases,
   k. aquaculture beds disposed in the area between said column pairs and below said first water distribution system,
   l. said beds including spaced apart water distribution aqueducts for distribution of water primarily in the winter.

2. An aquaculture housing pod as in claim 1 wherein said roof is suspended from a track supported in a plane disposed substantially parallel to said upper cable, and includes means for moving the roof along said track from an open position to a closed position.

3. An aquaculture housing pod as in claim 1 wherein said first water distribution system comprises a series of ducts supported from said vertical cables generally parallel to the longitudinal axis of said housing pod module, and includes means for carrying sprinkler heads on said ducts.

4. An aquaculture housing pod as in claim 1 wherein said water distribution aqueducts comprise U-shaped aluminum channels and said aquaculture beds includes a plant supporting material retained between said channels which overlies a water impervious membrane material secured to said channels.

5. An aquaculture housing pod as in claim 1 which includes track means for movably supporting said roof member secured to said vertical cables.

6. An aquaculture housing pod as in claim 1 which includes:
   a. a source of water heated to a temperature above the ambient temperature of local natural sources,
   b. means for distribution of said heated water to said first water distribution system or to said water distribution aqueducts,
   c. means to collect excess water from said water distribution system or said aqueducts,
   d. means to return said excess water to said heated water source or to said natural source.

7. An aquaculture housing pod as in claim 6 wherein said heated water distribution system includes valve means for selectively distributing said heated water to said first water distribution system during warm weather, and to said aqueduct distribution system during cold weather, or to both systems, in amounts proportionate to growth needs.

8. An aquaculture housing pod as in claim 1 which includes a plurality of said column, cable, and water distribution system modules, said lateral column spacing being greater than said longitudinal column spacing.

9. An apparatus as in claim 1 for simultaneous aquaculture and cooling of excess heated water from a waste hot water producing source comprising:
   a. means for collecting said heated water from said source,
   b. a first, hot water reservoir connected to said collection means,
   c. an aquaculture housing pod adapted for growth,
   d. means for distributing said hot water from said first reservoir to said aquaculture housing pod to promote said growth and to cool said water.
   e. means for collecting a portion of said cooled water from said aquaculture housing pod,
   f. a second reservoir for said cooled water connected to said cooled water collection means, and
   g. means for redistribution of at least a portion of said cooled water from said second reservoir to said source.

10. An apparatus as in claim 9 wherein said hot water distribution means, includes means for selectively distributing said hot water primarily to aqueducts in the winter and primarily to a sprinkler system in the summer in predetermined amounts in proportion to the growth needs.

* * * * *